Sept. 7, 1948.  R. D. TRELEASE ET AL  2,448,693
EVISCERATING METHOD AND APPARATUS Filed Dec. 27, 1943  2 Sheets-Sheet 1

Richard D. Trelease
and Carl H. Koonz
INVENTOR

ATTEST-
BY
ATTORNEY

Sept. 7, 1948.  R. D. TRELEASE ET AL  2,448,693
EVISCERATING METHOD AND APPARATUS Filed Dec. 27, 1943  2 Sheets-Sheet 2

Richard D. Trelease
and Carl H. Koonz
INVENTOR

ATTEST-

BY

ATTORNEY

Patented Sept. 7, 1948

2,448,693

UNITED STATES PATENT OFFICE 2,448,693

EVISCERATING METHOD AND APPARATUS

Richard D. Trelease and Carl H. Koonz, Chicago, Ill., assignors to Swift and Company, Chicago, Ill., a corporation of Illinois Application December 27, 1943, Serial No. 515,670

4 Claims. (Cl. 17—11)

This invention relates to a method and apparatus for treating an animal carcass and more particularly to a method and apparatus to be used during the evisceration of poultry for completing the removal of organs from the body cavity of fowl and the like.

It is an object of this invention to provide an improved method and apparatus for eviscerating an animal carcass.

It is another object of this invention to provide a method and means for removing certain organs from the thoracic region of an animal carcass.

It is still another object of this invention to provide a method and apparatus for loosening and removing organs from the body cavity, especially those organs which are lodged between the bones and in pockets formed in the bones of the carcass of a fowl and the like.

It is another object of this invention to provide a method and apparatus for lifting and removing certain organs from their place of lodgement between the bones and pockets formed in the bones of the carcass of a fowl or the like.

Other objects will appear from the specification below.

In the drawings:

Figure 2 is a side elevation of a vacuum nozzle for effecting the lifting and removal of the organs from the body cavity of a fowl and the like.

Figure 2:
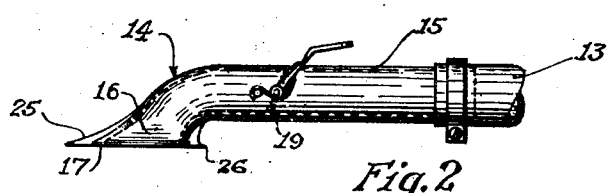

The problem of removing organs from various types of animals arises during many butchering operations, however, the present invention relates to a particular phase of the problem of evisceration and provides a new method and apparatus especially adapted to overcome the difficulties encountered in the handling of fowl and the like. In order to complete the evisceration in this instance, the method herein described and the apparatus shown in the drawings provides means adapted to reach into the body cavity of a carcass, to first lift an organ from a pocket in which it may be disposed, and thereafter remove the organ from the carcass.

The use of a vacuum device has previously been proposed for eviscerating the body cavity of animals, and an example of this is the use of a vacuum means to clean the body cavity of fish during preparation for canning. The present invention is an improvement on this type of device. This invention has been made to provide an improved method and mechanism for operating upon a particular carcass construction and is especially useful for the purpose of cleaning the carcass of a poultry product wherein the lungs, kidneys, etc., are either contained deep in the body cavity or are contained within crevices so as to be relatively inaccessible.

The peculiar problem which arises during the evisceration of a carcass of the type having avian anatomical characteristics is difficult of solution, and there is no presently known mechanism or method of removing certain of the organs contained in the body cavity except by a hand operation. In a carcass of an animal of the Aves class, certain of the organs are lodged between the ribs in the thoracic region so that an arduous effort must be made to lift them out of the carcass. In poultry for example the lungs are contained within the thoracic region of the body cavity and, when reaching in from the usual small opening provided at the posterior part of the carcass, in the vent area, it is difficult to detach the lungs from their thoracic attachments. Other organs or tissues are also disposed between the ribs and in crevices within the body cavity of a fowl which present additional problems in the removal thereof.

The present invention provides a new method for the cleaning of a carcass to accomplish the removal of the viscera and is particularly adapted to the completion of the evisceration after the bulk of the organs have been lifted from the body cavity. The invention is especially useful in association with the drawing or eviscerating lines such as are set up by the large poultry packers for mass butchering and when it is known that millions of pounds of carcasses are prepared for the market each year by the larger concerns, the necessity for the invention and its particular application become readily apparent. The present method and the apparatus for performing it are more fully described below, but first let us consider the particular problem involved.

During one phase of the cleaning of the carcass, it is necessary to remove the viscera. In the usual practice this is done by providing an opening in the body cavity through which the bulk of the viscera contained therein is removed and, thereafter, certain of the organs such as, in a chicken carcass, the kidneys, lungs, testes, ovaries, oviducts, bursa fabricus, proventriculus, etc., which are lodged between the ribs, in crevices, and otherwise attached to the walls of the carcass, are manually removed with a fork or serrated knife. Even though an operator becomes quite skilled at performing the final step of removing these organs, still the final cleaning operation of the body cavity is quite tedious and time consuming. The present invention is particularly adapted to the performance of this final cleaning step and provides a new apparatus and method for effecting the removal of the organs and tissues.

Figure 5:
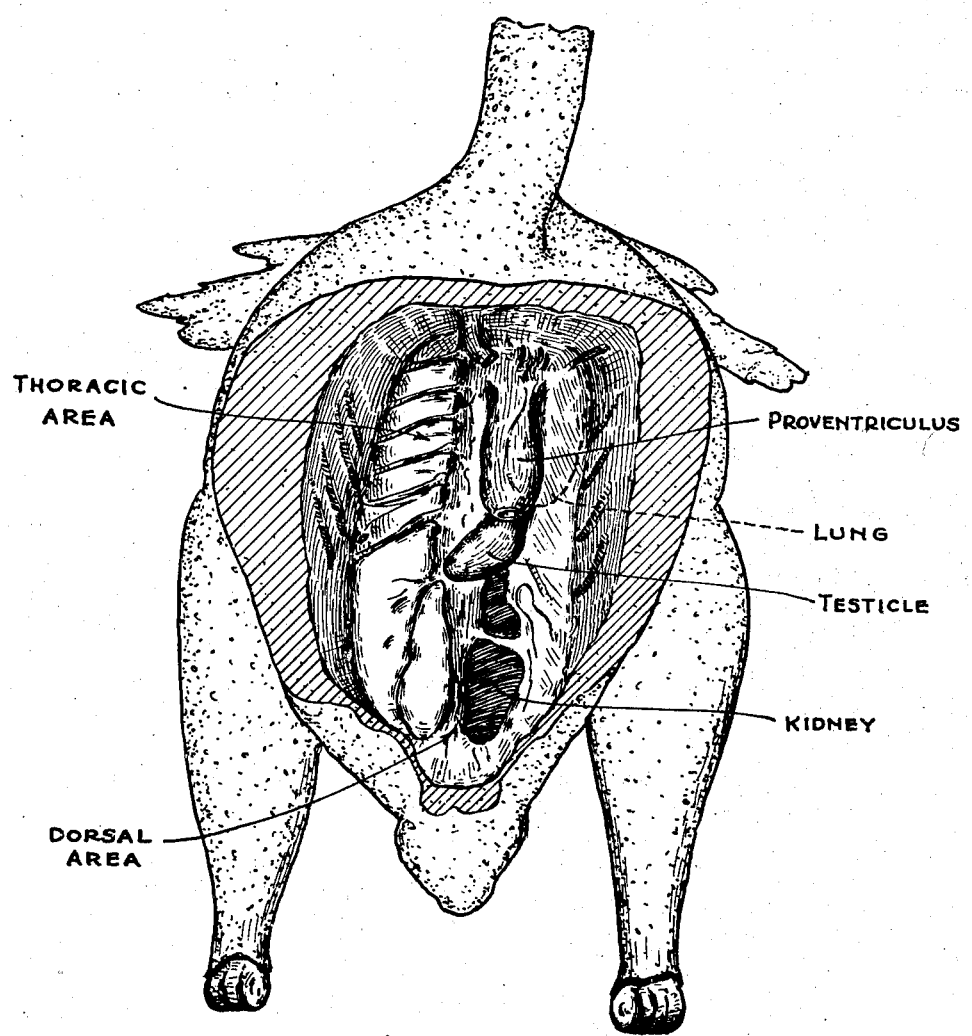
Figure 5 is a detail sectional view of a chicken carcass showing on one side of the backbone the position of some of the organs that must be removed during preparation of the carcass, and on the other side of the backbone, showing the bone structure of the carcass.

As above indicated, the present invention may have other uses, but its particular application is for completing the evisceration of a poultry carcass and upon inspection of the carcass of a fowl, or the like, and referring to the right hand side of Figure 5 the internal structure of the bird is shown. The section of the carcass structure shows that the dorsal surfaces of the lungs fit closely into the spaces between the ribs and are thereby in intimate association with the ribs. Ventrally the lungs are covered by a sheet of fibrous tissue arising from the peritoneum. It will also be noted that the kidneys, composed of three principal lobes, are relatively concealed, being lodged and fitted closely into the grooves or hollows of the pelvic bones. It is quite easy to visualize why organs such as lungs and kidneys so positioned are hard to remove and this is especially true since it is well known that the lungs and kidneys may be easily torn into many small pieces and, therefore, become very difficult to pick loose.

The present invention is designed particularly for use after the larger organs such as intestines, liver and gizzard have been removed from the body cavity of the fowl and when the carcass is ready for the final cleaning step. The removal of the larger organs can be accomplished by any convenient method and, thereafter, the evisceration of the carcass can be completed most efficiently by practicing the method here taught.

It has been found, if a reduced pressure is established in the body cavity immediately above and throughout an area surrounding that of the organs to be removed, that by lifting the organs vertically, the vacuum means is quite effective to rapidly dispose of the organs and tissue fixed to the walls of the body cavity, and disposed in the crevices etc.

It has been also determined that, if in addition to the application of a vacuum means, a flow of air is established immediately adjacent the mouth of the vacuum means a very rapid and efficient removal of the organs and tissue from the body cavity is made possible. It is thought that the rush of air through the confined passageways or channels formed between the adjacent ribs, pelvic bones, etc., thoroughly agitates the organs and tissue there disposed such that they are loosened and torn away from the carcass whereby the vacuum means when applied adjacent the loosened tissue, will rapidly convey it away.

The invention is more particularly shown in the drawings wherein an apparatus for performing this eviscerating operation is represented.

Figure 1:
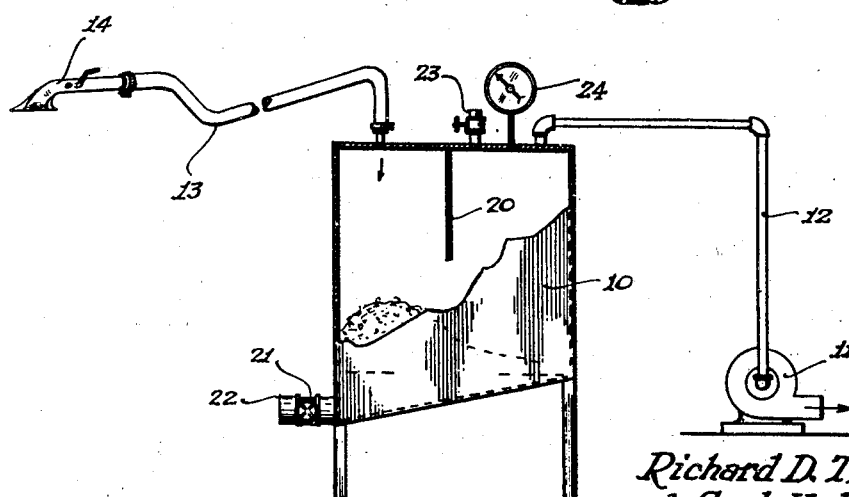
Figure 1 is an assembled view of an apparatus adapted to perform the method of this invention.

Referring to the assembly view of Figure 1, the chamber 10 is adapted to have a vacuum continuously produced therein by means of a vacuum pump 11 connected to the chamber through a conduit 12. The chamber 10 is provided with suitable nipple for connection of a flexible vacuum line 13 to the end of which a vacuum nozzle 14 is affixed.

Figure 3:
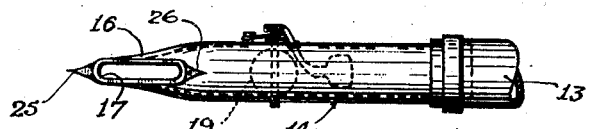
Figure 3 is a bottom plan view of the nozzle structure shown in Figure 2.

The vacuum nozzle 14 is best shown in Figures 2 and 3, it being composed of a handle section 15 and an inlet or working end 16. The inlet end 16 is provided with a lower surface 17 for engaging against the inner edges of the ribs, pelvic bones, etc. of the carcass and, as is best shown in Figure 3, it has a relatively elongated configuration with the longitudinal axis disposed substantially parallel to the longitudinal axis of the handle. The inlet opening in surface 17 is of such size as to permit easy passage for the largest pieces of tissue encountered, and surface 17 is preferably designed to have a length to reach across at least three ribs. It is to be noted, however, that these dimensions are not considered to be critical with respect to the performance of the eviscerating method here taught. The width of the inlet end of the nozzle is controlled only for the purpose of determining the free area of the working area of the nozzle and for convenience in working inside the body cavity of the carcass being eviscerated.

Figure 4:
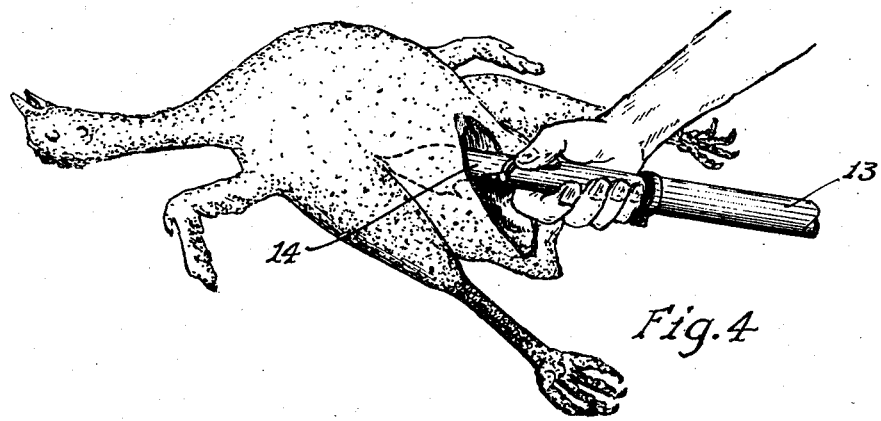
Figure 4 is a perspective view showing the manner of applying the vacuum nozzle to the carcass of a bird in practicing the present method.

The nozzle is adapted to be inserted in the usual posterior opening provided in the body cavity of the carcass and to be applied against the inner edges of the ribs, pelvic bones, etc., as is shown in Figure 4. The nozzle is moved across the internal surfaces in the body cavity, wherever the organs are lodged so that the organs are first loosened from their normal positions and are then lifted up into the inlet end of the nozzle as the vacuum means exerts its effects. The nozzle may be moved around in the cavity in a manner to subject the entire area to the agitation and organ removal action of the nozzle.

A nozzle, set up as shown in Figure 1, has been operated at a pressure of from 5 to 20 inches of mercury with an efficient removal of the organs from between the ribs and it does not appear that the degree of vacuum utilized is critical. On the other hand, a relationship does exist between the volume of air drawn through the nozzle and the vacuum produced in the vacuum chamber, and broadly it is that if the amount of air drawn in through the inlet is increased, the degree of vacuum can be reduced without sacrificing any efficiency in the final eviscerating process. In practice, a nozzle, having a longitudinal axis of one inch and a width of one-half an inch, has been found to be quite effective and such a nozzle has about equal efficiency, when used with five inches of mercury vacuum and an air flow of 215 cubic feet per minute, as a ¾ inch by ⅜ inch nozzle operated at a vacuum of 10 inches of mercury and an air flow of 20 cubic feet per minute. When either one of these nozzles is operated under the conditions set forth, the final eviscerating operation can be completed in a matter of seconds.

Not only does this method and apparatus speed up the time in which the body cavity cleaning operation can be performed, but also a much more thorough cleaning can be accomplished. The step of utilizing the air flow into the inlet nozzle for loosening the organs and tissues, which cling to the ribs, pelvic bones etc., cooperates with the vacuum step to remove much of the tissues which could not be economically reached during a manual eviscerating operation.

Referring to Figure 5 it will be seen that, while organs such as the testes and the like which are attached near the anterior end of the kidneys through the connective tissues, may be reached for removal by hand, it is practically impossible to scrape out all of the connective tissue and softer organs like the kidneys. Notwithstanding the great difficulty encountered in the removal of this softer, clinging tissue, the government regulation covering quick frozen, eviscerated poultry require its substantially complete elimination. This cleaning method is particularly effective for removing this connective tissue and such delicate tissues as the lungs, kidneys, etc., which tend to cling onto the ribs, pelvic bones, etc., when it is sought to remove them by hand. However, in following this invention a suction is used either alone or in connection with an agitating air flow and all portions of the lung connective tissues etc., are easily torn loose from the carcass to which they normally adhere so that they may then be lifted and withdrawn by the vacuum means.

In operating the device for the most convenient performance of the invention herein disclosed, the carcass of the bird to be cleaned is laid on its back, with the posteriorly provided opening to the partially emptied body cavity facing the operator. As soon as the nozzle has been placed within the body cavity, the working surface 17 of the nozzle is laid against the inner dorsal surface of the carcass, and the removal of tissue and any of the removable organs affixed to this portion of the carcass is begun. As the nozzle is worked down along the edges of the ribs, pelvic bones, etc., the spaces, crevices and pockets there present in the body cavity are thoroughly cleaned as the organs are loosened and then lifted upwardly into the vacuum means which then causes them to be delivered through the flexible vacuum line 13 into vacuum chamber 10. Preferably, a relatively large flow of air is established in addition to the application of a vacuum means so that the cleaning operation may be done more rapidly and thoroughly.

This invention is particularly adapted to a production line evisceration system wherein the eviscerating is done while the birds are hanging on shackles and are continuously delivered along the line.

The above embodies one form of the apparatus for practicing this invention. In a modification of this simplified structure, a valve 19 may be placed in the vacuum nozzle so that the vacuum in chamber 10 may be maintained efficiently while the nozzle is being transferred from the carcass of one bird to the carcass of another. Also the chamber 10, as shown in Figure 1, may be and preferably is provided with a baffle 20 to prevent material flowing into the chamber from passing into conduit 12 leading to the vacuum pump 11. The chamber 10 may also be equipped with a suitable valve 21 and outlet passage 22 for eliminating the viscera delivered into the chamber 10 and conventional means may be used to permit the withdrawal of the viscera without breaking the vacuum. A vent valve 23 and pressure gauge 24 are provided in order that a vacuum maintained in the chamber may be controlled.

A further suggested modification may be incorporated on the working end 16 of the vacuum nozzle by the addition of cutting blades 25 and 26 affixed to the forward and rear sides of the working surface 17. If a thorough removal of the larger viscera from the body cavity is not accomplished during the initial eviscerating operation, the addition of cutting means such as the knives 25 and 26 aids in the completion of the cleaning operation by cutting through such tissue as blood vessels, nerves, etc., which lay above the inner edges of the ribs, pelvic bones, etc., thus mechanically tearing or breaking these tissues as the nozzle is pushed along whereby they may be more easily removed.

The working end of the nozzle may be further modified by disposing the open working area of the nozzle so that its longitudinal axis is disposed at right angles to the axis of the handle of the nozzle. Such a construction enables the operator to remove both lungs, or all of the kidneys of a chicken, for example, at the same time.

The above described apparatus and modifications thereof disclose the preferred form of apparatus for practicing the method described herein. Many modifications of the invention will occur to those skilled in the art, all of which are contemplated to fall within the scope of the following claims.

We claim:

1. An improved apparatus including a nozzle means and a driven means to produce an air flow for use in completing the evisceration of fowl and the like by removing the organs and tissues lodged between the ribs, pelvic bones, and crevices in the body cavity of a bird's carcass after removal of the bulk of the viscera from the body cavity; the driven air-flow-producing means being used in combination with the nozzle for creating at least a partial vacuum and an energetic flow of air; said nozzle having a flat-faced inlet end adapted to ride over the inner edges of the ribs, pelvic bones and crevices in the body cavity of the bird's carcass; said nozzle being provided with cutting means fixed adjacent the inlet end and extending back from the flat face of the inlet and along the sides of the nozzle; said cutting means being operative to sever portions of the viscera, nerves and blood vessels projecting above the inner edges of the ribs, pelvic bones and crevices in the body cavity; said nozzle including means for positioning the opening so as to establish said vacuum immediately above the inner edges of the ribs, pelvic bones, and crevices in the body cavity whereby the energetic air flow which is induced into the opening is caused to first pass between the ribs, pelvic bones, and the crevices, while flowing to the opening, so as to loosen and break free all the organs and tissues lodged therein, the air flow also serving to carry the organs and tissues thus freed to the opening, where the vacuum is operative to effect a removal of the organs from the body cavity of the carcass.

2. A method for eviscerating poultry carcass comprising the step of cutting a slit in the posterior portion of the carcass, manually removing through the slit a substantial portion of the viscera, particularly the intestines, liver, and gizzard, and thereafter removing by pneumatic suction the lungs, kidneys, testes, ovaries, and other loose viscera not previously manually removed, simultaneously cutting while pneumatically removing viscera which is normally not readily separable from other portions of the carcass, and pneumatically cleaning the internal surfaces from which the viscera has been removed.

3. A method for eviscerating poultry carcass comprising the step of cutting a slit in the posterior portion of the carcass, manually removing through the slit a substantial portion of the viscera, particularly the intestines, liver, and gizzard, and thereafter removing by pneumatic suction the lungs, kidneys, testes, ovaries, and other loose viscera not previously manually removed, simultaneously severing while pneumatically removing viscera which is normally not readily separable from other portions of the carcass, and pneumatically cleaning the internal surfaces from which the viscera has been removed.

4. An improved apparatus including a nozzle means and a driven means to produce an air flow for use in completing the evisceration of fowl and the like by removing the organs and tissues lodged between the ribs, pelvic bones, and crevices in the body cavity of a bird's carcass after removal of the bulk of the viscera from the body cavity; the driven air-flow-producing means being used in combination with the nozzle for creating at least a partial vacuum and an energetic flow of air; said nozzle having a flat-faced inlet end adapted to ride over the inner edges of the ribs, pelvic bones and crevices in the body cavity of the bird's carcass; said nozzle being provided with severing means adjacent the inlet end and extending back from the flat face of the inlet and along the sides of the nozzle; said severing means being operative to sever portions of the viscera, nerves and blood vessels projecting above the inner edges of the ribs, pelvic bones and crevices in the body cavity; said nozzle including means for positioning the opening so as to establish said vacuum immediately above the inner edges of the ribs, pelvic bones, and crevices in the body cavity whereby the energetic air flow, which is induced into the opening, is caused to first pass between the ribs, pelvic bones, and the crevices, while flowing to the opening, and with the severing means loosen and break free all the organs and tissues lodged therein, the air flow also serving to carry the organs and tissues thus freed to the opening, where the vacuum is operative to effect a removal of the organs from the body cavity of the carcass.

RICHARD D. TRELEASE.
CARL H. KOONZ.

REFERENCES CITED

The following references are of record in the file of this patent:

UNITED STATES PATENTS

| Number | Name | Date |
| --- | --- | --- |
| D. 75,195 | Sweeny | May 15, 1928 |
| 92,769 | Youngblood | July 20, 1869 |
| 1,053,665 | Spencer | Feb. 18, 1913 |
| 1,134,530 | Hauber | Apr. 6, 1915 |
| 1,416,013 | Gieseler | May 16, 1922 |
| 1,446,854 | Marshall | Feb. 27, 1923 |
| 2,192,838 | McGrew | Mar. 5, 1940 |
| 2,262,724 | Hoffman | Nov. 11, 1941 |

FOREIGN PATENTS

| Number | Country | Date |
| --- | --- | --- |
| 464,634 | Germany | Aug. 22, 1928 |